United States Patent
Yoneda

(10) Patent No.: US 12,288,660 B2
(45) Date of Patent: Apr. 29, 2025

(54) PROTECTIVE ELEMENT

(71) Applicant: DEXERIALS CORPORATION, Tochigi (JP)

(72) Inventor: Yoshihiro Yoneda, Shimotsuke (JP)

(73) Assignee: DEXERIALS CORPORATION, Tochigi (JP)

( * ) Notice: Subject to any disclaimer, the term of this patent is extended or adjusted under 35 U.S.C. 154(b) by 513 days.

(21) Appl. No.: 17/593,893

(22) PCT Filed: Mar. 19, 2020

(86) PCT No.: PCT/JP2020/012375
§ 371 (c)(1),
(2) Date: Sep. 27, 2021

(87) PCT Pub. No.: WO2020/196294
PCT Pub. Date: Oct. 1, 2020

(65) Prior Publication Data
US 2022/0199346 A1    Jun. 23, 2022

(30) Foreign Application Priority Data

Mar. 28, 2019    (JP) ................................ 2019-064820

(51) Int. Cl.
*H01H 85/165*    (2006.01)
*H01H 85/055*    (2006.01)
*H01H 85/38*    (2006.01)

(52) U.S. Cl.
CPC ........ *H01H 85/055* (2013.01); *H01H 85/165* (2013.01); *H01H 85/38* (2013.01)

(58) Field of Classification Search
CPC ........... H01H 85/055; H01H 85/08–11; H01H 85/165; H01H 85/38
See application file for complete search history.

(56) References Cited

U.S. PATENT DOCUMENTS 3,198,914 A * 8/1965 Baran .................... H01H 85/36
                                                        337/414
3,436,712 A * 4/1969 Heaney ................ H01H 37/761
                                                        337/401

(Continued)

FOREIGN PATENT DOCUMENTS

CN        104185889 A    12/2014
CN        109216112 A    1/2019

(Continued)

OTHER PUBLICATIONS

"Korean Application Serial No. 10-2021-7030239, Office Action dated Jun. 15, 2023", w English Translation, (Jun. 15, 2023), 11 pgs.

(Continued)

*Primary Examiner* — Jacob R Crum
(74) *Attorney, Agent, or Firm* — Schwegman Lundberg & Woessner, P.A.

(57) ABSTRACT

This protective element includes a first electrode portion, a second electrode portion disposed distant from the first electrode portion, a fuse element portion having spring characteristics, and a case that houses at least a portion of the fuse element portion, wherein the fuse element portion includes a first end section that is connected to the first electrode portion, a second end section that is connected to the second electrode portion, and a cutoff section that is positioned between the first end section and the second end section, and the fuse element portion is held inside the case in a bent state such that, when the fuse element portion is cut, both cut ends of the cutoff section are pulled apart from each other.

18 Claims, 8 Drawing Sheets

(56) References Cited

U.S. PATENT DOCUMENTS

| | | | | |
|---|---|---|---|---|
| 2006/0028315 | A1* | 2/2006 | Kawanishi | H01H 37/76 337/4 |
| 2010/0176910 | A1* | 7/2010 | Knab | H01H 37/761 337/290 |
| 2013/0313008 | A1* | 11/2013 | Steiner | H01H 85/046 337/294 |
| 2015/0084734 | A1* | 3/2015 | Yoneda | H01H 85/06 337/183 |
| 2015/0371803 | A1 | 12/2015 | Hosomizo et al. | |
| 2016/0049275 | A1* | 2/2016 | Stözinger | H01H 85/055 337/186 |

FOREIGN PATENT DOCUMENTS

| | | | |
|---|---|---|---|
| GB | 648031 | A | 12/1950 |
| JP | 48045248 | U1 | 6/1973 |
| JP | 03001418 | A | 1/1991 |
| JP | 3149727 | A | 6/1991 |
| JP | 06084446 | A | 3/1994 |
| JP | 2006059568 | A | 3/2006 |
| JP | 4192266 | B2 | 12/2008 |
| JP | 2012234774 | A | 11/2012 |
| JP | 2013229293 | A | 11/2013 |
| JP | 6249600 | B2 | 12/2017 |
| JP | 6249602 | B2 | 12/2017 |
| JP | 2019016507 | A | 1/2019 |
| KR | 19840003427 | | 7/1984 |
| KR | 20140140100 | A | 12/2014 |
| KR | 20150115834 | | 10/2015 |
| TW | 201405617 | | 2/2014 |
| TW | 201802854 | | 1/2018 |
| WO | WO-2013146889 | A1 | 10/2013 |

OTHER PUBLICATIONS

"International Application Serial No. PCT/JP2020/012375, International Preliminary Report on Patentability mailed Jul. 20, 2021", w/ English Translation, (Jul. 20, 2021), 20 pgs.

"International Application Serial No. PCT/JP2020/012375, International Search Report mailed Jun. 23, 2020", w/ English Translation, (Jun. 23, 2020), 5 pgs.

"International Application Serial No. PCT/JP2020/012375, Written Opinion mailed Jun. 23, 2020", (Jun. 23, 2020), 4 pgs.

"Taiwanese Application Serial No. 109110226, Office Action dated Jun. 28, 2023", w English Translation, (Jun. 28, 2023), 16 pgs.

"Chinese Application Serial No. 202080023036.5, Office Action dated Mar. 14, 2024", w/ English Translation, (Mar. 14, 2024), 16 pgs.

* cited by examiner

PROTECTIVE ELEMENT

PRIORITY APPLICATIONS

This application is a U.S. National Stage Filing under 35 U.S.C. § 371 from International Application No. PCT/JP2020/012375, filed on Mar. 19, 2020, and published as WO2020/196294 on Oct. 1, 2020, which claims the benefit of priority to Japanese Application No. 2019-064820, filed on Mar. 28, 2019; the benefit of priority of each of which is hereby claimed herein, and which applications and publication are hereby incorporated herein by reference in their entireties.

TECHNICAL FIELD

The present invention relates to a protective element.

BACKGROUND ART

Conventionally, protective elements fitted with a fuse element that heats and melts, thereby breaking the current path, when an electrical current exceeding the rated value flows through the element have been widely used.

Examples of widely used protective elements include holder-fixed fuses having a solder enclosed in a glass tube, chip fuses in which an Ag electrode is printed on the surface of a ceramic substrate, and screw-fastened or plug protective elements in which a portion of a copper electrode is narrowed and incorporated into a plastic case. With these protective elements, surface mounting by reflow is difficult, and because the efficiency of component mounting deteriorates, or because even if surface mounting is possible, the rated current is low, high-rated surface-mounted protective elements have recently been developed (for example, see Patent Documents 1 and 2).

Surface-mounted protective elements are employed, for example, as a protective element against overcharging or overcurrent in a battery pack that uses a lithium ion secondary battery. Lithium ion secondary batteries are used in mobile equipment such as laptop computers, mobile phones and smart phones, and in recent years, have also started to be employed in electric tools, electric bikes, electric motorcycles, and electric vehicles. As a result, protective elements for use with large currents and high voltages are now required.

In protective elements for use with high voltages, an arc discharge can occur when the fuse element melts. When an arc discharge is generated, the fuse element melts over a wide area, and vaporized metal may sometimes be scattered. In such cases, there is a possibility that the scattered metal may form a new current path, or may adhere to terminals or surrounding electronic components or the like. Accordingly, in protective elements for use with high voltages, countermeasures are adopted which either prevent arc discharge generation or stop arc discharge.

One known countermeasure for either preventing arc discharge generation or stopping arc discharge involves packing an arc-extinguishing material around the fuse element (for example, see Patent Document 3).

Further, another known method for stopping arc discharge employs a protective element in which the fuse element and a spring in a torsioned state having an accumulated elastic restoring force are connected in series and bonded together using a low-melting point metal (for example, see Patent Documents 4 to 6). In this type of protective element, when an overcurrent flows through the element and melts the low-melting point metal, the elastic restoring force of the spring promotes separation between the spring and the fuse element, making a more rapid circuit breakage possible upon overcurrent.

Arc discharges are dependent on field intensity (voltage/distance), meaning an arc discharge does not stop until the distance between the contact points reaches at least a certain distance. Accordingly, protective elements that use a spring are able to rapidly stop arc discharge by utilizing the elastic restoring force of the spring to rapidly separate the spring and the fuse element to a distance where arc discharge can no longer be maintained.

PRIOR ART LITERATURE

Patent Documents

Patent Document 1: Japanese Patent (Granted) Publication No. 6249600
Patent Document 2: Japanese Patent (Granted) Publication No. 6249602
Patent Document 3: Japanese Patent (Granted) Publication No. 4192266
Patent Document 4: Japanese Unexamined Patent Application, First Publication No. Hei 06-84446
Patent Document 5: Japanese Unexamined Patent Application, First Publication No. 2006-59568
Patent Document 6: Japanese Unexamined Patent Application, First Publication No. 2012-234774

SUMMARY OF INVENTION

Problems to be Solved by the Invention

However, in the case of the aforementioned protective elements that use an arc-extinguishing material, the production process is complex, and miniaturization of the protective element is difficult.

Furthermore, in the case of the aforementioned protective elements that use a spring, the bonding strength between the fuse element and the spring tends to be prone to deterioration over time in the usage environment, meaning long-term stability can be a concern.

The present invention has been developed in light of the above circumstances, and has an object of providing a protective element that suppresses arc discharge when the fuse element is cut while maintaining long-term stability, and does not require the use of an arc-extinguishing material.

Means for Solving the Problems

In order to achieve the above object, the present invention provides the following aspects.

(1) A protective element according to one aspect of the present invention has a first electrode portion, a second electrode portion disposed distant from the first electrode portion, a fuse element portion having spring characteristics, and a case that houses at least a portion of the fuse element portion, wherein the fuse element portion includes a first end section that is connected to the first electrode portion, a second end section that is connected to the second electrode portion, and a cutoff section that is positioned between the first end section and the second end section, and the fuse element portion is held inside the case in a bent state such that, when the fuse element portion is cut, both cut ends of the cutoff section are pulled apart from each other.

(2) In the aspect according to (1) above, in order to bend the fuse element portion so that both cut ends of the cutoff section are pulled apart from each other, the protective element may include a first securing portion that contacts and presses against one surface of the fuse element portion, and a second securing portion that contacts and presses against the other surface of the fuse element portion.

(3) In the aspect according to (1) or (2) above, the fuse element portion may be held inside the case in a state that is bent into an S-shape.

(4) In the aspect according to any one of (1) to (3) above, the cutoff section may be positioned in a central inflection section of the fuse element portion.

(5) In the aspect according to any one of (1) to (4) above, when an overcurrent flows, the fuse element portion may be released from the bent state and be physically cut.

(6) In the aspect according to any one of (1) to (5) above, the cutoff section may have a plurality of holes, and may have a narrower width and/or a thinner thickness than the first end section and the second end section.

(7) In the aspect according to any one of (1) to (6) above, the cutoff section may be held in a state sandwiched between claw-like portions provided on the first end section and the second end section.

(8) In the aspect according to any one of (1) to (7) above, the cutoff section may be a laminated body having an inner layer composed of a low-melting point metal and an outer layer composed of a high-melting point metal.

(9) In the aspect according to (8) above, the protective element may have a heating element that heats the cutoff section.

(10) In the aspect according to (9) above, the protective element may have a third electrode portion, wherein a heat-generating body provided in the heating element may have one end connected to the third electrode portion and the other end connected to at least one of the cutoff section, the first end section and the second end section.

(11) In the aspect according to (9) or (10) above, when the heating element is heated, the low-melting point metal of the cutoff section may melt and soften the cutoff section, and the fuse element portion may be released from the bent state and physically cut.

Effects of the Invention

The present invention is able to provide a protective element that suppresses arc discharge when the fuse element is cut while maintaining long-term stability, and does not require the use of an arc-extinguishing material.

EMBODIMENTS FOR CARRYING OUT THE INVENTION

Figure 1:
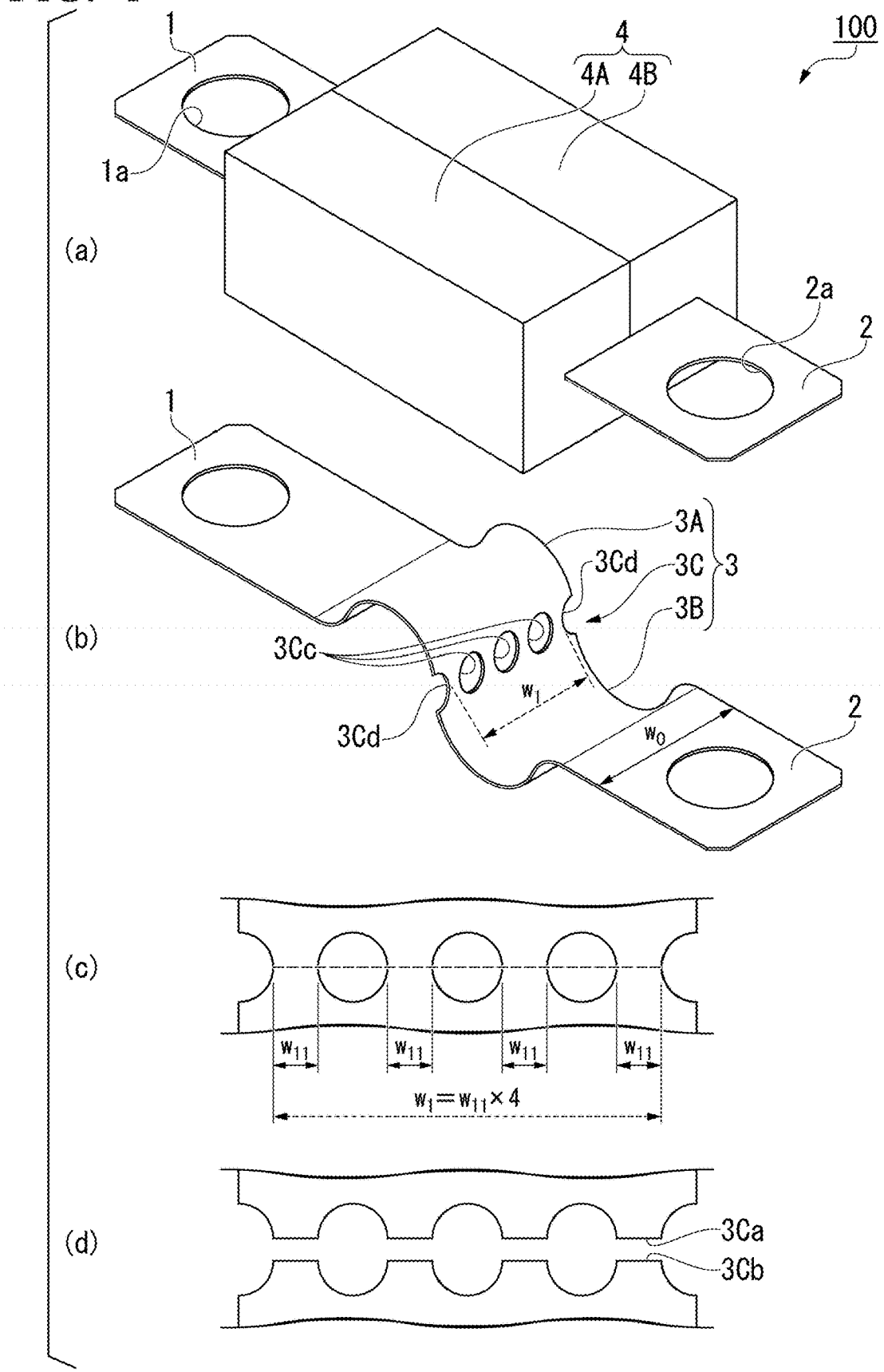
FIG. 1, (a) is a schematic perspective view of a protective element according to a first embodiment, (b) is a schematic perspective view of the protective element illustrated in (a) with the case 4 removed, (c) is a schematic front view illustrating an enlargement of the vicinity of the cutoff section of the fuse element portion 3, and (d) is a schematic view illustrating the state immediately following cutting of the cutoff section illustrated in (c).

Embodiments of the present invention are described below in detail with appropriate reference to the drawings. The drawings used in the following description may sometimes be drawn with specific portions enlarged as appropriate to facilitate comprehension of the features of the present invention, and the dimensional ratios and the like between the constituent elements may differ from the actual values. Further, the materials and dimensions and the like presented in the following description are merely examples, which in no way limit the present invention, and may be altered as appropriate within the scope of the present invention.

First Embodiment

FIG. 1(a) is a schematic perspective view of a protective element 100 according to the first embodiment, FIG. 1(b) is a schematic perspective view of the protective element 100 illustrated in (a) with a case 4 removed, FIG. 1(c) is a schematic front view illustrating an enlargement of the vicinity of a cutoff section 3C of a fuse element portion 3, and FIG. 1(d) is a schematic view illustrating the state immediately following cutting of the cutoff section 3C illustrated in (c).

The protective element 100 illustrated in FIGS. 1(a) to 1(d) has a first electrode portion 1, a second electrode portion 2 disposed distant from the first electrode portion 1, a fuse element portion 3 having spring characteristics, and a case 4 (composed of a first case section 4A and a second case section 4B) that houses at least a portion of the fuse element portion 3. The fuse element portion 3 includes a first end section 3A that is connected to the first electrode portion 1, a second end section 3B that is connected to the second electrode portion 2, and a cutoff section 3C that is positioned between the first end section 3A and the second end section 3B. The fuse element portion 3 is held inside the case 4 in a bent state such that, when the fuse element portion 3 is cut, both cut ends 3Ca and 3Cb (see FIG. 1(d)) of the cutoff section 3C are pulled apart from each other.

In the protective element 100 illustrated in FIGS. 1(a) to 1(d), the first electrode portion 1, the second electrode portion 2 and the fuse element portion 3 are formed from a single plate-like member, but each portion may also be formed from a separate member. In those cases where these portions are formed from separate members, those members may be connected using conventional methods. For example, the members may be connected by soldering.

<First Electrode Portion, Second Electrode Portion>

The first electrode portion 1 and the second electrode portion 2 are positioned distant from each other.

The first electrode portion 1 and the second electrode portion 2 are connected electrically to the first end section 3A and the second end section 3B respectively of the fuse element portion 3.

Conventional electrode materials can be used for the first electrode 1 and the second electrode 2, and examples include metals (including alloys), with specific examples including copper, brass, nickel, stainless steel and 42 alloy (Fe-42% Ni).

In the protective element 100 illustrated in FIGS. 1(a) to 1(d), in those cases where the first electrode portion 1 and the second electrode portion 2 are formed together with the fuse element portion 3 from a single plate-like member, the single plate-like member is formed from a material having spring characteristics. In such cases, the material is preferably a metal material (or alloy) suitable for a plate spring material at low resistance, and specific examples include phosphor bronze, copper alloys, titanium-copper, Corson alloy and beryllium-copper.

The first electrode 1 and second electrode 2 illustrated in FIG. 1(b) have an overall rectangular shape when viewed in a plan view, but any shape may be used provided that the effects of the present invention can be achieved.

The first electrode 1 and the second electrode 2 have an external terminal hole 1a and an external terminal hole 2a respectively.

Of this pair of external terminal holes 1a and 2a, one external terminal hole may be used for connecting to a power source side, and the other external terminal hole may be used for connection to the load side.

Although there are no particular limitations on the thickness of the first electrode 1 and the second electrode 2, typical values are within a range from 0.05 to 0.5 mm.

<Fuse Element Portion>

The fuse element portion 3 includes the first end section 3A connected to the first electrode portion 1, the second end section 3B connected to the second electrode portion 2, and the cutoff section 3C positioned between the first end section 3A and the second end section 3B. The fuse element portion 3 has spring characteristics, and is held in a bent state such that, when the fuse element portion 3 is cut, both cut ends 3Ca and 3Cb (see FIG. 3(b)) of the cutoff section 3C are pulled apart from each other.

This "bent state such that, when the fuse element portion is cut, both cut ends of the cutoff section are pulled apart from each other" refers to a state in which the fuse element portion is bent with an accumulated elastic restoring force, so that when the fuse element portion is cut, both cut ends of the cutoff section are pulled apart from each other.

The fuse element portion 3 illustrated in FIGS. 1(a) to 1(d) has only a single cutoff section, but may be provided with a plurality of cutoff sections.

In this description, the term "spring characteristics" describes a characteristic in which a material deforms when a force is applied, but then returns to its original form when the force is removed. Specifically, the fuse element portion 3 having spring characteristics is held in a bent state such that, when the fuse element portion is cut, both cut ends 3Ca and 3Cb of the cutoff section 3C are pulled apart from each other, and when the fuse element portion 3 is heated during overcurrent flow, the fuse element portion 3 is released from this bent state, and the cutoff section 3C can be physically cut.

In the protective element 100 illustrated in FIGS. 1(a) to 1(d), as one example, the first end section 3A and the second end section 3B are bent in opposite directions to form an S-shaped state, but there are no limitations on the manner in which the fuse element portion 3 is bent, provided that the cutoff section 3C is imparted with an elastic restoring force that causes the cut ends to be pulled apart from each other.

The protective element 100 illustrated in FIGS. 1(a) to 1(d) illustrates an example in which the cutoff section 3C is positioned in a central inflection section of the fuse element portion 3, but the invention is not limited to this structure.

The fuse element portion 3 is formed from a conductive material having spring characteristics. Metal materials (including alloys) suitable for a plate spring material at low resistance are preferred, and specific examples include phosphor bronze, copper alloys, titanium-copper, Corson alloy and beryllium-copper.

In those cases such as the protective element 100 illustrated in FIGS. 1(a) to 1(d), in which the first electrode portion 1, the second electrode portion 2 and the fuse element portion 3 are composed of a single member, the locations from which the deformation used for imparting the elastic restoring force begins are deemed to indicate the fuse element portion 3.

The cutoff section 3C preferably has a structure that is physically more easily cut than the first end section 3A and the second end section 3B. In such cases, the fuse element portion 3 has the first end section 3A, the second end section 3B, and the cutoff section 3C which is positioned between the first end section 3A and the second end section 3B, and has a structure that is physically more easily cut than the first end section 3A and the second end section 3B.

In the protective element 100 illustrated in FIGS. 1(a) to 1(d), the cutoff section 3C represents an example of a structure having three holes 3Cc aligned across the width direction, and notches 3Cd provided in both side edges. With the notches 3Cd provided in both side edges, the total width of the cutoff section 3C excluding the holes 3Cc, namely, the total distance (total width) $w_1$ ($w_{11} \times 4$) obtained by adding the distances (widths) between adjacent holes 3Cc, and the distances (widths) between the outside holes 3Cc and the notches 3Cd, is formed with a narrower width than the width $w_0$ of the first end section 3A and the second end section 3B (see FIGS. 1(b) and 1(c)). In FIGS. 1(b) and 1(c), $w_1$ is the total width of the cutoff section 3C excluding the holes 3Cc, and is therefore shown as a dotted line.

There are no particular limitations on the number of holes or the positions of those holes. The cutoff section 3C may have holes, and also have a thickness that is thinner than the thickness of the first end section 3A and the second end section 3B. Further, the cutoff section 3C may have holes, also have a thickness that is thinner than the thickness of the first end section 3A and the second end section 3B, and also have a width that is narrower than the width of the first end section 3A and the second end section 3B.

By using such structures, localized heating enables the cutoff section 3C to be physically cut more easily.

Figure 2:
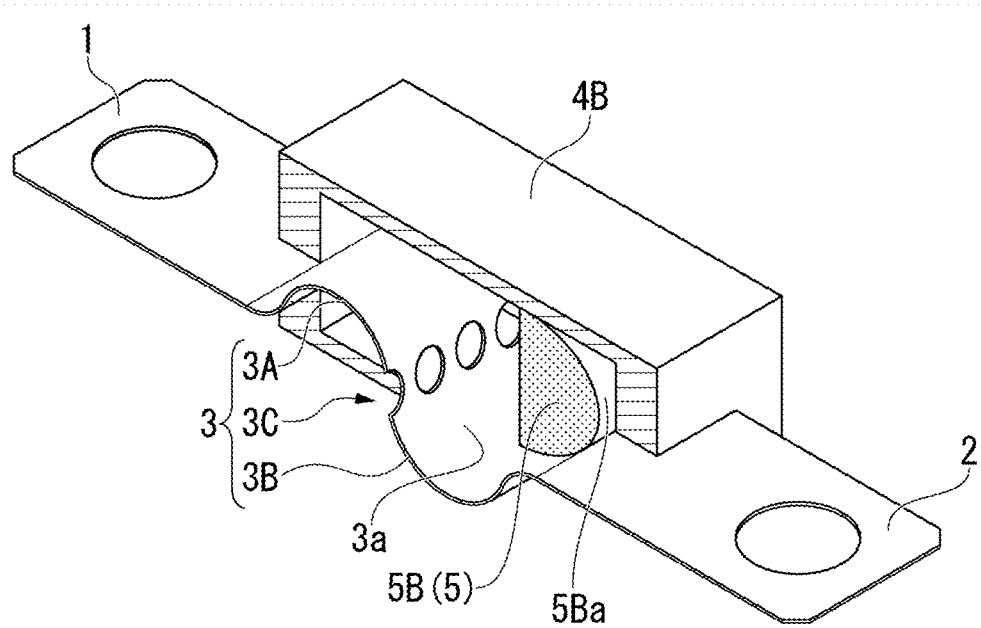
FIG. 2 is an exploded perspective view of the protective element 100 illustrated in FIG. 1(a) with a first case section 4A removed.

FIG. 2 is an exploded perspective view of the protective element 100 illustrated in FIG. 1(a) with the first case section 4A removed. Further, FIGS. 3(a) to 3(c) are a series of schematic cross-sectional views of the protective element 100 illustrated in FIG. 1(a), wherein FIG. 3(a) is a schematic cross-sectional view of the state prior to cutting of the fuse element portion 3, FIG. 3(b) is a schematic cross-sectional view of the state immediately following cutting of the fuse element portion 3, and FIG. 3(c) is a schematic cross-sectional view of the state following cutting of the fuse element portion 3. In FIG. 3(a), the direction indicated by x is the direction along which the first electrode portion 1, the fuse element portion 3 and the second electrode portion 2 are arranged, the direction indicated by y represents the width direction of those members, and the direction indicated by z is the direction orthogonal to both the direction x and the direction y.

In the cutoff section 3C, although there are no particular limitations on the method used for imparting the elastic restoring force that causes the cut ends to be pulled apart from each other, in order to impart a continuous elastic restoring force within the cutoff section 3C, a structure may be employed in which elastic forces having force components in opposite directions are imparted continuously within the cutoff section 3C from the side of the first end section 3A and from the side of the second end section 3B.

<First Securing Portion, Second Securing Portion>

One example of such a structure is illustrated in FIG. 2 and FIGS. 3(a) to 3(c), wherein in order to impart an elastic restoring force within the cutoff section 3C that causes the cut ends to be pulled apart from each other, the protective element 100 also includes a first securing portion 5B that contacts and presses against one surface (the upper surface) 3a of the fuse element portion 3, and a second securing portion 5A that contacts and presses against the other surface (the lower surface) 3b of the fuse element portion 3.

The first securing portion 5A and the second securing portion 5B can be formed from a material having insulating properties, such as an engineering plastic, alumina, glass ceramic, mullite or zirconia. Securing portions formed from the same material as that used for the case 4 described below may be used.

The bent state of the fuse element portion 3 of the example illustrated in FIGS. 1(a) to 1(d) through to FIGS. 3(a) to 3(c) is described below in further detail.

The first securing portion 5A and the second securing portion 5B illustrated in FIG. 2 and FIGS. 3(a) to 3(c) each have a semicircular cylindrical shape, and the diameter of that shape has substantially the same dimension as the height of the interior of the case 4 (namely, the distance (distance in the z direction) from a bottom surface 4b to a ceiling surface 4a). Inside the case 4, the first securing portion 5A and the second securing portion 5B are disposed such that, in the z direction of the semicircular cylindrical shapes, a flat surface 5Aab incorporating the diameter linking a bottom edge 5Aa and a top edge 5Ab, and a flat surface 5Bab incorporating the diameter linking a bottom edge 5Ba and a top edge 5Bb are mutually parallel, while the direction of extension of the cylinders of the semicircular cylindrical shapes is parallel with the y direction.

Within the first end section 3A of the fuse element portion 3, the underside surface of a portion 3Aa on the side of the first electrode portion 1 is pressed in the +z direction by an outside surface 5AA of the semicircular cylindrically shaped first securing portion 5A. This portion 3Aa is sandwiched between the top edge 5Ab of the outside surface 5AA and the ceiling surface 4a of the interior of the case 4, and a portion that is bent in the −z direction from this sandwiched position is deemed the portion 3Ab, meaning the first end section 3A has this type of bent state. Because the fuse element portion 3 has spring characteristics, within the first end section 3A, an elastic restoring force acts that will cause the portion 3Ab to move toward the ceiling surface 4a of the interior of the case 4.

Further, within the second end section 3B of the fuse element portion 3, the upper surface of a portion 3Ba on the side of the second electrode portion 2 is pressed in the −z direction by an outside surface 5BB of the semicircular cylindrically shaped second securing portion 5B. This portion 3Ba is sandwiched between the bottom edge 5Ba of the outside surface 5BB and the bottom surface 4b of the interior of the case 4, and a portion that is bent in the +z direction from this sandwiched position with a similar curvature to the portion 3Ba is deemed the portion 3Bb, meaning the second end section 3B has this type of bent state. Because the fuse element portion 3 has spring characteristics, within the second end section 3B, an elastic restoring force acts that will cause the portion 3Bb to move toward the bottom surface 4b of the interior of the case 4.

Because the fuse element portion 3 exists in this type of bent state, elastic restoring forces having force components in opposite directions are applied to the portion 3Aa of the first end section 3A on the side of the first electrode portion 1, and the portion 3Ba of the second end section 3B on the side of the second electrode portion 2 respectively. Accordingly, when cutting occurs in the cutoff section 3C, the cut ends 3Ca and 3Cb (see FIG. 3(b)) are pulled apart from one another.

In the state illustrated in FIG. 2 and FIGS. 3(a) to 3(c), when an overcurrent flows through the protective element, and the temperature of the fuse element portion 3 exceeds the temperature caused by current flow during typical operation of the device in which the protective element is provided, resulting in softening or partial melting of the fuse element portion 3, then as illustrated in FIGS. 3(b) and 3(c), the bent state is released, the cutoff section 3C is physically cut, and the circuit current is cut off. Here, the state in which the fuse element portion 3 softens or partially melts describes a state in which a solid phase and a liquid phase are mixed or coexist.

In this manner, in the protective element 100, the fact that the fuse element portion 3 itself is physically cut differs from the aforementioned spring-based protective elements in which the bond between the fuse element portion and the spring is severed.

Arc discharge is dependent on field intensity, which is inversely proportional to distance, and in the protective element 100, because the distance between the cut surfaces of the cut fuse element portion is increased rapidly by the elastic restoring force accumulated in the first end section 3A and the second end section 3B, any arc discharge can be rapidly stopped.

Further, in the protective element 100, the fuse element portion can be cut at a temperature at which the fuse element portion has softened prior to reaching a melted state, namely a lower temperature than that required to reach a melted state, and therefore the risk of arc discharges occurring can be reduced.

<Case>

The case 4 can be formed from a material having insulating properties, such as an engineering plastic, alumina, glass ceramic, mullite or zirconia.

The case 4 is preferably formed from a ceramic material having a high level of thermal conductivity such as alumina. The heat generated by an overcurrent through the fuse element portion can then be efficiently radiated externally, and the fuse element portion that is supported in mid-air can be heated and melted locally.

Second Embodiment

Figure 3:
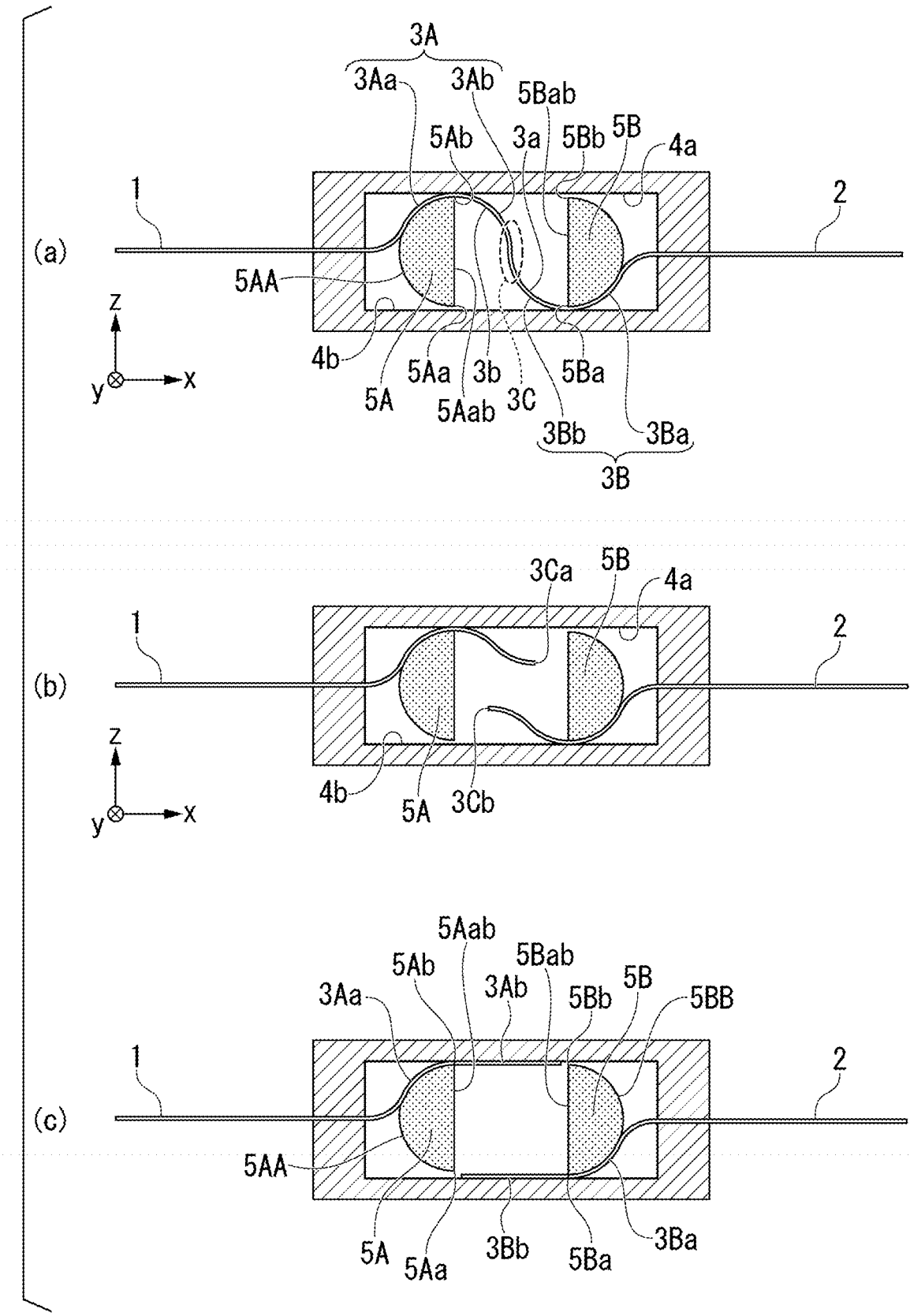
FIG. 3 is a series of schematic cross-sectional views of the protective element 100 illustrated in FIGS. 1(a) to 1(d), wherein (a) is a schematic cross-sectional view of the state prior to cutting of the fuse element portion 3, and (b) and (c) are schematic cross-sectional views of states following cutting of the fuse element portion 3.
Figure 4:
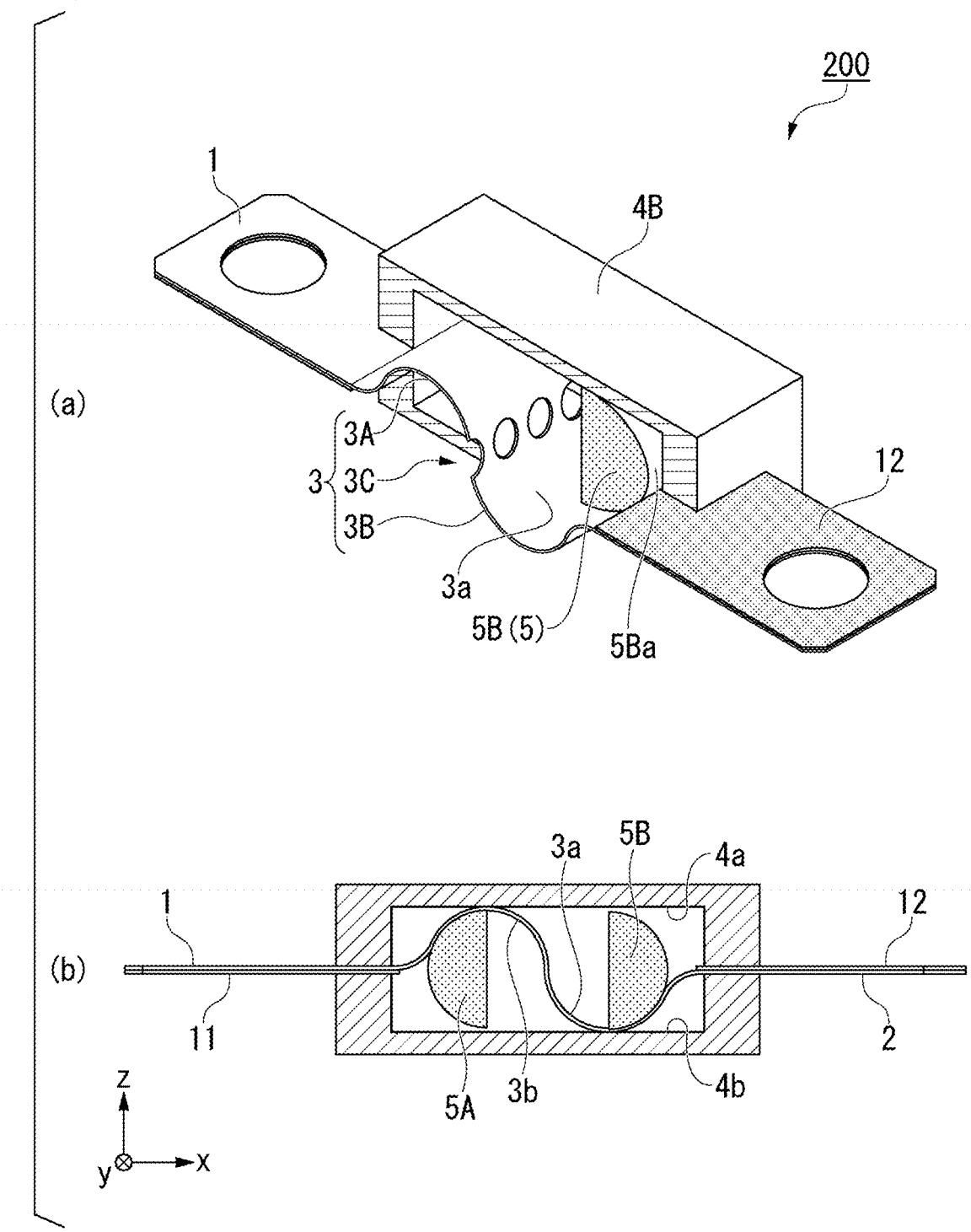
FIG. 4 is a series of schematic views of the main components of a protective element according to a second embodiment, wherein (a) is a schematic perspective view that corresponds with FIG. 2, and (b) is a schematic cross-sectional view that corresponds with FIG. 3(a).

FIGS. 4(*a*) and 4(*b*) are schematic views of the main components of a protective element 200 according to a second embodiment, wherein FIG. 4(*a*) is a schematic perspective view that corresponds with FIG. 2, and (b) is a schematic cross-sectional view that corresponds with FIG. 3(*a*). Those members using the same symbols as the first embodiment are deemed to have the same structure, and description of those members is omitted. Further, even descriptions of members having a different symbol from the first embodiment may sometimes be omitted if the function of the member is the same.

The main point of difference of the protective element 200 according to the second embodiment, compared with the protective element 100 according to the first embodiment, is that terminal members 11 and 12 which reinforce the rigidity of the external connections of the first electrode portion 1 and the second electrode portion 2 respectively and reduce the electrical resistance are connected to the first electrode portion 1 and the second electrode portion 2 respectively so as to overlap in the thickness direction of the electrode portions.

Specifically, compared with the protective element 100 illustrated in FIG. 1(*a*), the protective element 200 illustrated in FIG. 4(*a*) has a first terminal member 11 connected to the first electrode portion 1, and a second terminal member 12 connected to the second electrode portion 2. In the protective element 200 illustrated in FIG. 4(*a*), the surfaces of the first electrode portion 1 and the second electrode portion 2 to which the first terminal member 11 and the second terminal member 12 respectively are connected differ, but a structure in which the terminal members are connected to surfaces on the same side may also be used.

The first terminal member 11 has an external terminal hole in a position corresponding with the external terminal hole 1*a* provided in the first electrode portion 1. Further, the second terminal member 12 has an external terminal hole in a position corresponding with the external terminal 2*a* provided in the second electrode portion 2.

<First Terminal Member, Second Terminal Member>

Examples of the material for the first terminal member 11 and the second terminal member 12 include copper and brass and the like.

Of those materials, from the viewpoint of strengthening the rigidity, brass is preferred.

Of those materials, from the viewpoint of reducing electrical resistance, copper is preferred.

The materials for the first terminal member 11 and the second terminal member 12 may be the same or different.

Conventional methods may be used for connecting the first terminal member 11 and the second terminal member 12 to the first electrode portion 1 and the second electrode portion 2 respectively, and examples of suitable methods include bonding by welding, mechanical joining methods such as riveting or screwing, and soldering methods.

Although there are no limitations on the thickness of the first terminal member 11 and the second terminal member 12, typical values may be within a range from 0.3 to 1.0 mm.

The thicknesses of the first terminal member 11 and the second terminal member 12 may be the same or different.

Third Embodiment

Figure 5:
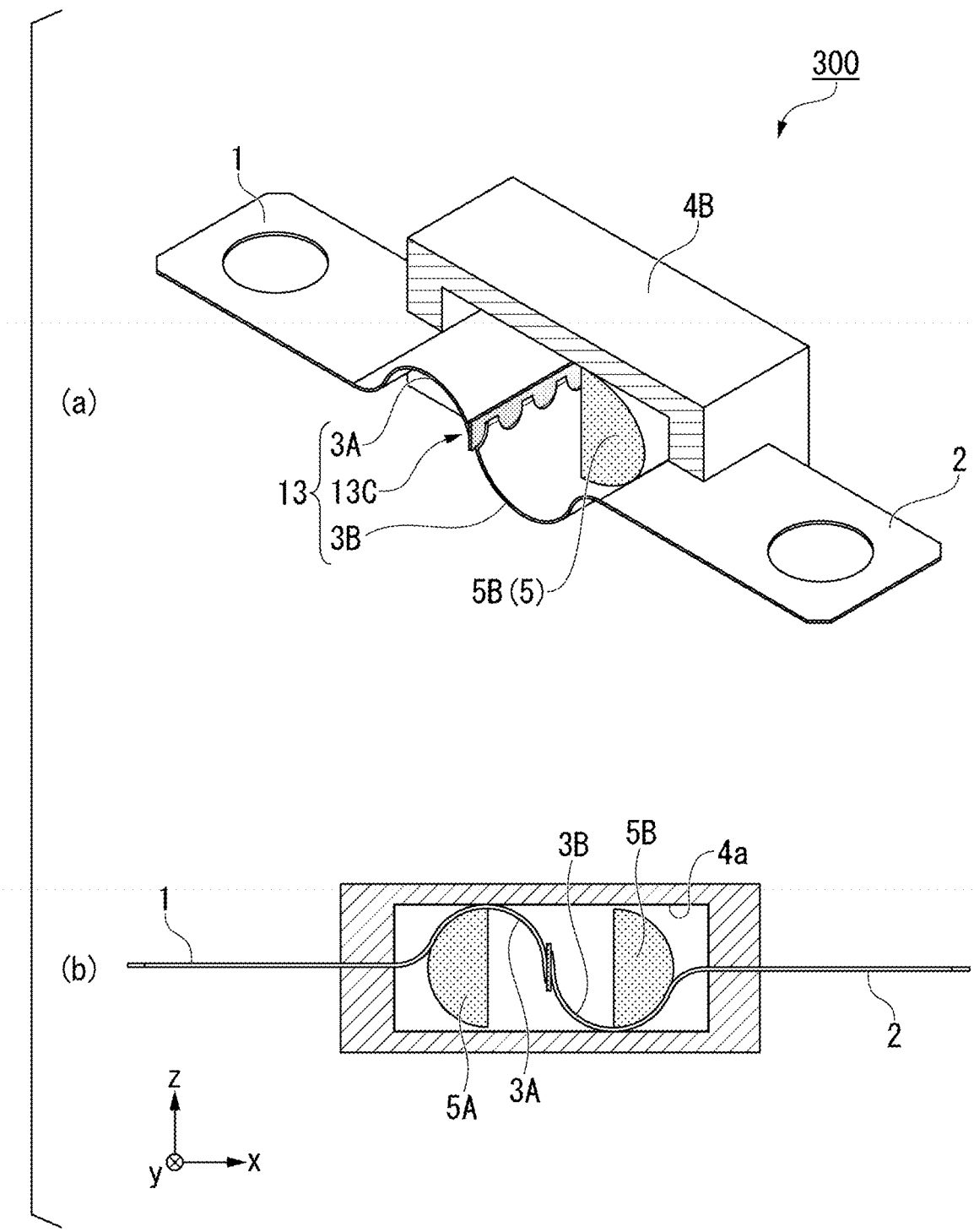
FIG. 5 is a series of schematic views of the main components of a protective element according to a third embodiment, wherein (a) is a schematic perspective view that corresponds with FIG. 2, and (b) is a schematic cross-sectional view that corresponds with FIG. 3(a).

FIGS. 5(*a*) and 5(*b*) are schematic views of the main components of a protective element 300 according to a third embodiment, wherein FIG. 5(*a*) is a schematic perspective view that corresponds with FIG. 2, and FIG. 5(*b*) is a schematic cross-sectional view that corresponds with FIG. 3(*a*). Those members using the same symbols as the embodiments described above are deemed to have the same structure, and description of those members is omitted. Further, even descriptions of members having a different symbol from the above embodiments may sometimes be omitted if the function of the member is the same.

The main feature of the protective element 300 according to the third embodiment is that a cutoff section 13C of the fuse element portion is formed from a material having a lower melting point than that of the material of the first end section 3A and the second end section 3B.

The cutoff section 13C of the protective element 300 according to the third embodiment may have a structure that is physically easily cut, in a similar manner to the cutoff section 3C of the protective element 100 according to the first embodiment, as well as being formed from a material having a low melting point.

Specifically, compared with the protective element 100 illustrated in FIG. 1(*a*), in the protective element 300 illustrated in FIGS. 5(*a*) and 5(*b*), the cutoff section 13C disposed between the first end section 3A and the second end section 3B in a fuse element portion 13 is formed from a material having a lower melting point than that of the material of the first end section 3A and the second end section 3B.

The first end section 3A and the second end section 3B can be connected to the cutoff section 13C using conventional methods, and for example, may be connected by soldering.

For example, one end of the thin plate-like cutoff section 13C and one end of the first end section 3A may be overlaid and connected by soldering. Further, the other end of the thin plate-like cutoff section 13C and one end of the second end section 3B may also be overlaid and connected by soldering. The end of the first end section 3A and the end of the second end section 3B are overlaid so as not to overlap one another.

Examples of the material having a lower melting point than that of the material of the first end section 3A and the second end section 3B include Pb alloys.

In the protective element 300 illustrated in FIGS. 5(*a*) and 5(*b*), the cutoff section 13C may be formed as a laminated body having an inner layer composed of a low-melting point metal and an outer layer composed of a high-melting point metal with a higher melting point than the low-melting point metal.

In such cases, the first end section 3A and the second end section 3B can be connected to the laminated body using conventional methods, and for example, may be connected by soldering.

In the case of a structure in which the cutoff section 13C is a laminated body containing a high-melting point metal layer and a low-melting point metal layer, the rigidity of the cutoff section 13C can be maintained by the high-melting point metal layer, while including the low-melting point metal layer means the cutoff section 13C can soften or partially melt at a lower temperature, enabling cutting of the cutoff section 13C.

A solder such as a Pb-free solder containing Sn as the main component is preferably used as the low-melting point metal used in the low-melting point metal layer. The reason for this preference is that Sn has a melting point of 217° C., meaning solders containing Sn as the main component have low melting points and soften at low temperatures.

Ag, Cu, or an alloy containing one of these metals as the main component is preferably used as the high-melting point metal used in the high-melting point metal layer. The reason for this preference is that, for example, Ag has a melting point of 962° C., and therefore a high-melting point layer composed of an alloy containing Ag as the main component can maintain rigidity at the temperature at which the low-melting point metal layer softens.

Fourth Embodiment

Figure 6:
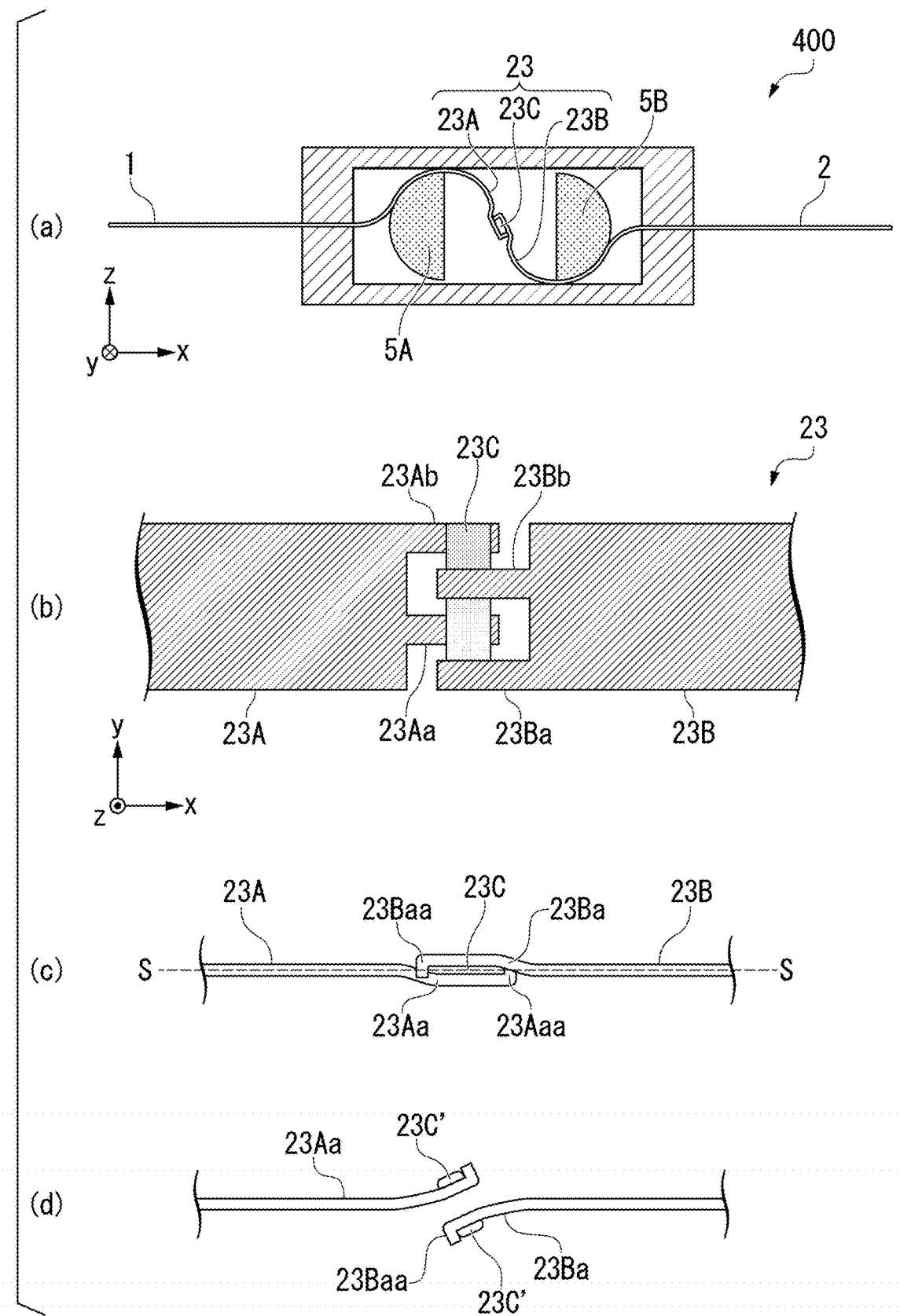
FIG. 6 is a series of schematic views of the main components of a protective element according to a fourth embodiment, wherein (a) is a schematic cross-sectional view of the fuse element portion viewed from the y direction, (b) is a schematic plan view viewed from the z direction of the portion of the structure in which the first end section and the second end section sandwich the cutoff section, (c) is a schematic side view viewed from the y direction of the portion of the structure in which the first end section and the second end section sandwich the cutoff section, and (d) is a schematic side view viewed from the y direction of the structure illustrated in (c) following cutting of the cutoff section.

FIGS. 6(a) to 6(d) are schematic views of the main components of a protective element 400 according to a fourth embodiment, wherein FIG. 6(a) is a schematic cross-sectional view that corresponds with FIG. 3(a), FIG. 6(b) is a schematic plan view of a fuse element portion 23, FIG. 6(c) is a schematic side view viewed from they direction of the portion of the structure in which a first end section 23A and a second end section 23B sandwich a cutoff section 23C, and FIG. 6(d) is a schematic side view viewed from the y direction of the structure illustrated in FIG. 6(c) following cutting of the cutoff section. Those members using the same symbols as the embodiments described above are deemed to have the same structure, and description of those members is omitted. Further, even descriptions of members having a different symbol from the above embodiments may sometimes be omitted if the function of the member is the same.

The main point of difference of the protective element 400 according to the fourth embodiment, compared with the protective element 300 according to the third embodiment, is that the cutoff section 23C of the fuse element portion 23 is sandwiched between claw-like portions 23Aa, 23Ab, 23Ba and 23Bb provided on the first end section 23A and the second end section 23B. The cutoff section 23C is supported in a stable manner by these claw-like portions 23Aa, 23Ab, 23Ba and 23Bb.

Specifically, in the protective element 400 illustrated in FIGS. 6(a) and 6(b), the fuse element portion 23 is composed of the first end section 23A which is provided with the claw-like portion 23Aa and the claw-like portion 23Ab, the second end section 23B which is provided with the claw-like portion 23Ba and the claw-like portion 23Bb, and the cutoff section 23C which is sandwiched between the claw-like portion 23Aa and the claw-like portion 23Ab, and the claw-like portion 23Ba and the claw-like portion 23Bb.

Each claw-like portion preferably has a folded bent section at the tip of the claw-like portion to enable the cutoff section 23C to be supported in a more stable manner.

FIG. 6(c) illustrates a bent section 23Aaa of the claw-like portion 23Aa, and a bent section 23Baa of the claw-like portion 23Ba.

As illustrated in FIG. 6(c) and FIG. 6(d), prior to cutting of the cutoff section 23C, the claw-like portion 23Aa and the claw-like portion 23Ab are positioned in a bent state above the S-S plane in the z direction (see FIG. 6(c)), but following cutting of the cutoff section 23C, the bent state is released, and the claw-like portion 23Aa and the claw-like portion 23Ab are positioned below the S-S plane (see FIG. 6(c)). In other words, in the state where no bending force is applied, the claw-like portion 23Aa and the claw-like portion 23Ab are positioned below the S-S plane, but the cutoff section 23C is bent by pressure from above. The claw-like portion 23Aa and the claw-like portion 23Ab are released from the bending force when the cutoff section 23C is cut, and return to their normal state under the elastic restoring force.

Similarly, prior to cutting of the cutoff section 23C, the claw-like portion 23Ba and the claw-like portion 23Bb are positioned below the S-S plane in the z direction (see FIG. 6(c)), but following cutting of the cutoff section 23C, are positioned above the S-S plane (see FIG. 6(d)). In other words, in the state where no bending force is applied, the claw-like portion 23Ba and the claw-like portion 23Bb are positioned above the S-S plane, but the cutoff section 23C is bent by pressure from beneath. The claw-like portion 23Ba and the claw-like portion 23Bb are released from the bending force when the cutoff section 23C is cut, and return to their normal state under the elastic restoring force.

The reference sign 23C' in FIG. 6(d) indicates residual portions following cutting of the cutoff section 23C.

Fifth Embodiment

Figure 7:
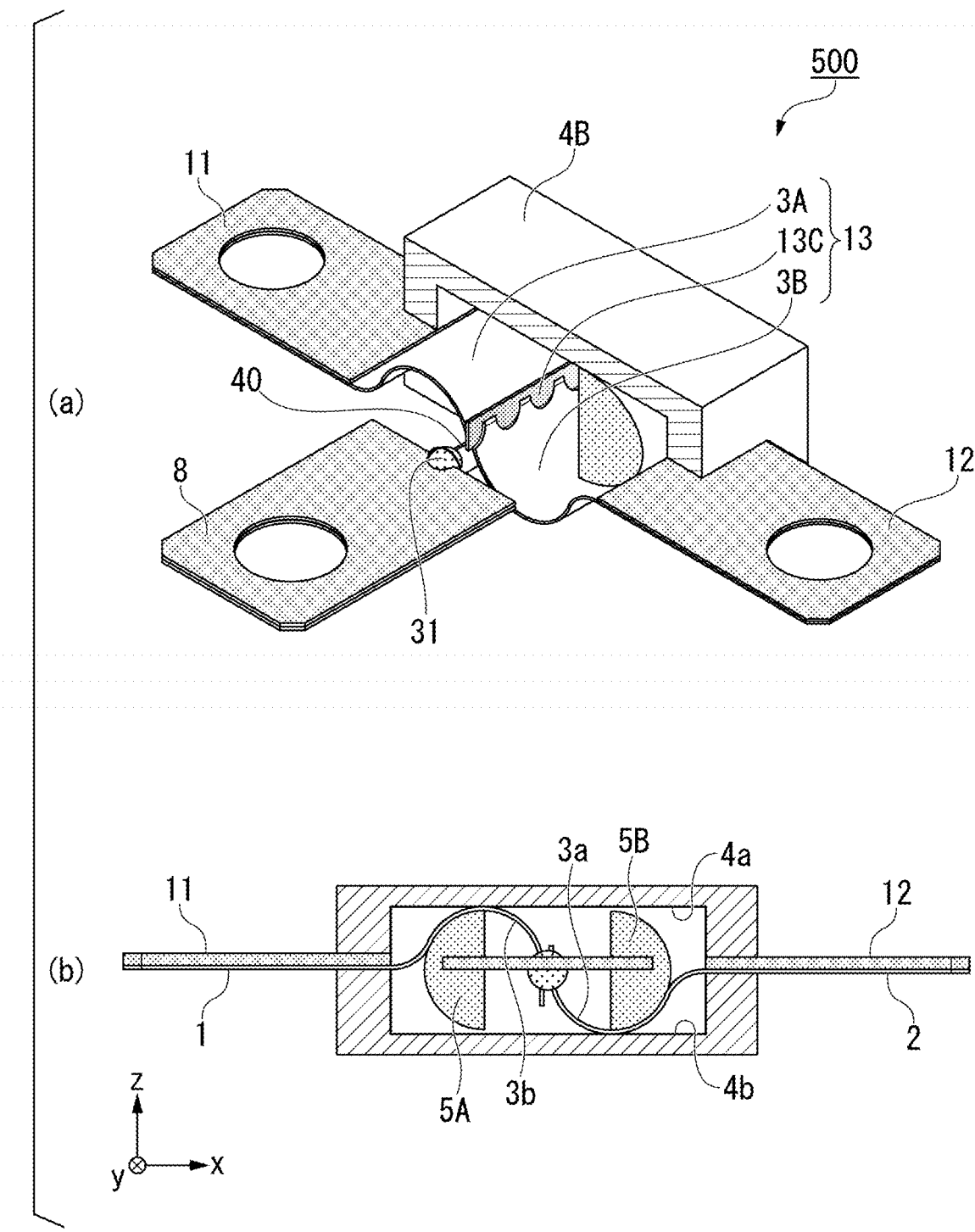
FIG. 7 is a series of schematic views of the main components of a protective element according to a fifth embodiment, wherein (a) is a schematic perspective view that corresponds with FIGS. 5(a), and (b) is a schematic cross-sectional view that corresponds with FIG. 5(b).

FIGS. 7(a) and 7(b) are schematic views of the main components of a protective element 500 according to a fifth embodiment, wherein FIG. 7(a) is a schematic perspective view that corresponds with FIG. 5(a), and FIG. 7(b) is a schematic cross-sectional view that corresponds with FIG. 5(b). Those members using the same symbols as the embodiments described above are deemed to have the same structure, and description of those members is omitted. Further, even descriptions of members having a different symbol from the above embodiments may sometimes be omitted if the function of the member is the same.

The protective element 500 according to the fifth embodiment represents a case in which the cutoff section 13C is a laminated body having an inner layer composed of a low-melting point metal and an outer layer composed of a high-melting point metal, and differs from the protective element according to the third embodiment by also including a heating element 40 that heats the cutoff section of the fuse element.

Further, the protective element 500 according to the fifth embodiment also differs from the protective element 300 according to the third embodiment by also including a third electrode portion 8, and having one end of a heat-generating body 41 connected to the third electrode portion 8, and the other end connected to at least one of the fuse element portion 13, the first electrode portion 1 and the second electrode portion 2.

Specifically, compared with the protective element 300 illustrated in FIGS. 5(a) and 5(b), the protective element 500 illustrated in FIGS. 7(a) and 7(b) includes the heating element 40 that heats the cutoff section 13C of the fuse element portion 13, and also includes the third electrode portion 8, wherein one end of the heating element 40 is connected electrically to the third electrode portion 8, and the other end is connected electrically to at least one of the fuse element portion 13, the first electrode portion 1 and the second electrode portion 2. Furthermore, the cutoff section 13C is a laminated body having an inner layer composed of a low-melting point metal and an outer layer composed of a high-melting point metal.

Figure 8:
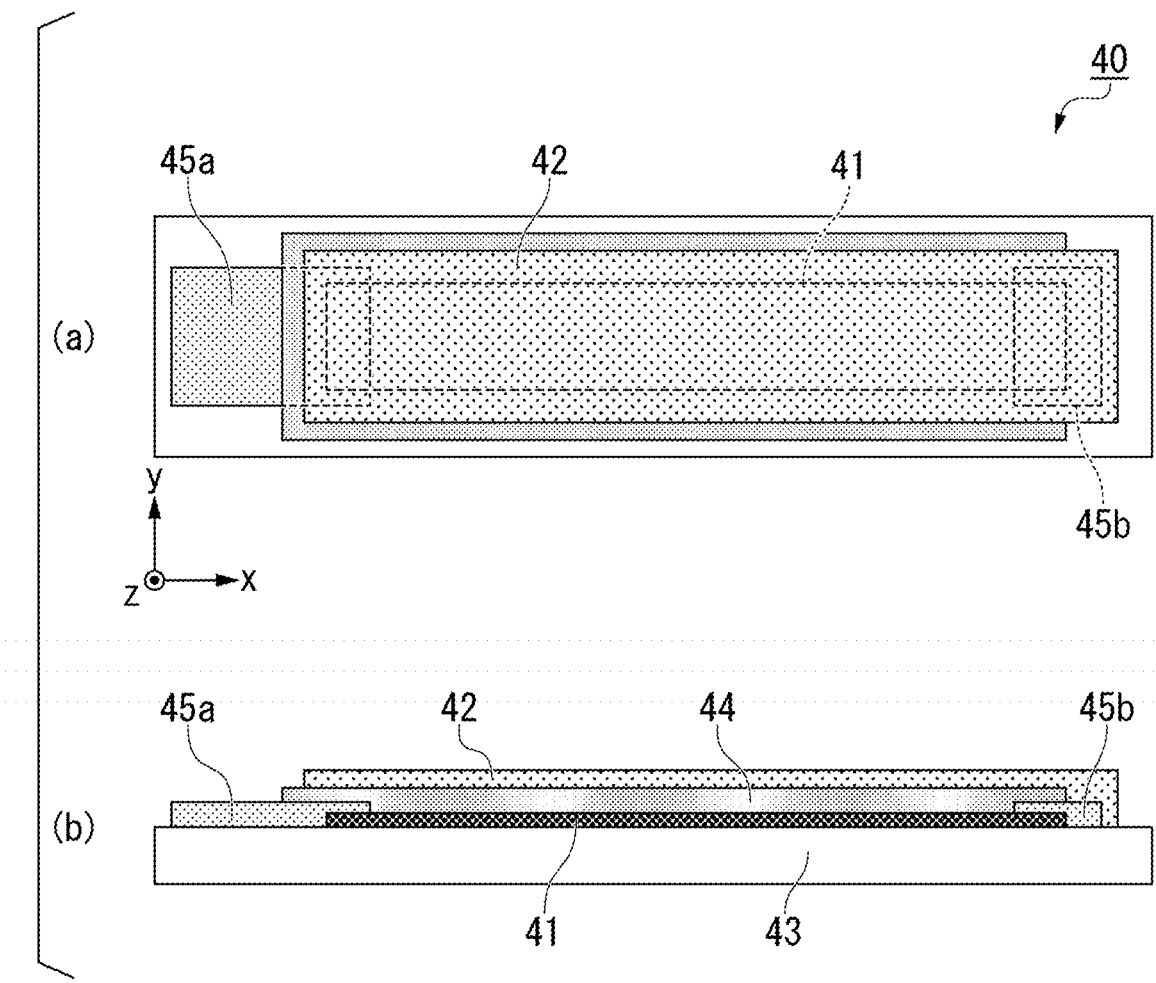
FIG. 8 is a series of schematic views of the structure of one example of a heating element, wherein (a) is a schematic plan view viewed from the z direction, and (b) is a schematic cross-sectional view of the structure in (a) viewed from the y direction.

FIG. 8 is a series of schematic views of the structure of one example of the heating element 40, wherein FIG. 8(a) is a schematic plan view viewed from the z direction, and FIG. 8(b) is a schematic cross-sectional view of the structure in (a) viewed from the y direction.

The heating element 40 has a heat-generating body 41, and also has an electrode layer 42, on the surface on the side of the cutoff section 13C of the fuse element portion 13, that is connected electrically to the heat-generating body 41.

The heating element 40 is also provided with an insulating substrate 43 on which the heat-generating body 41 is formed, an insulating layer 44 that covers the heat-generating body 41, and heat-generating body electrodes 45a and 45b formed at the two ends of the insulating substrate 43.

The heat-generating body 41 is formed from a material having conductivity that generates heat upon current flow, such as nichrome, W, Mo or Ru or the like, or a material containing one of these metals. The heat-generating body 41 is formed by mixing a powder of one of these alloys, or a composition or compound thereof, with a resin binder or the like, using the resulting paste to form a pattern on the insulating substrate 43 using a screen printing technique, and then firing the resulting structure.

The insulating substrate 43 is a substrate having insulating properties, such as alumina, glass ceramic, mullite or zirconia.

The insulating layer 44 is provided to protect and insulate the heat-generating body 41, as well as facilitating the efficient transfer of the heat generated by the heat-generating body 41 to the fuse element portion 3.

In the protective element 500 illustrated in FIGS. 7(a) and 7(b), the heat-generating body 41 is connected to the cutoff section 13C of the fuse element portion 13 via the electrode layer 42. Further, the third electrode portion 8 is connected electrically to the heat-generating body electrode 45a of the heating element 40 via a connection conductor 31.

In the protective element 500 illustrated in FIGS. 7(a) and 7(b), when the current path of the external circuit requires cutting, current is supplied to the heat-generating body 41 by a current control element provided in the external circuit. As a result, the cutoff section 13C of the fuse element portion 13 is heated by the heat-generating body 41 and softens or partially melts, causing cutting of the cutoff section 13C. By cutting the cutoff section 13C, the current path of the external circuit is cut, and power supply to the heat-generating body 41 is also cut.

In those cases where the cutoff section 13C is formed from a laminated body of a high-melting point metal layer and a low-melting point metal layer, heating by the heating element causes the low-melting point metal layer to melt, which is then pulled toward the highly wettable first and second electrode portions and the electrode layer 42, while eroding the high-melting point metal layer.

When the low-melting point metal layer melts, and the overall cutoff section softens sufficiently to enable deformation by an external force, the cutoff section is cut by the elastic restoring forces accumulated in the first end section 3A and the second end section 3B.

DESCRIPTION OF THE REFERENCE SIGNS

1: First electrode portion
2: Second electrode portion
3, 13, 23: Fuse element portion
3A, 23A: First end section
3B, 23B: Second end section
3C, 13C, 23C: Cutoff section
3Ca, 3Cb: Cut end
4: Case
5A: First securing portion
5B: Second securing portion
8: Third electrode portion
11: First terminal member
12: Second terminal member
40: Heating element
41: Heat-generating body
100, 200, 300, 400, 500: Protective element

The invention claimed is:

1. A protective element comprising:
a case having a first opening and a second opening at opposite ends of the case;
a first electrode portion;
a second electrode portion disposed distant from the first electrode portion;
a fuse element portion having spring characteristics and comprising:
a first end section that is connected to the first electrode portion which passes through the first opening;
a second end section that is connected to the second electrode portion which passes through the second opening;
and a cutoff section that is positioned between the first end section and the second end section; and
a first securing portion disposed in an internal chamber of the case, wherein the first end section, the second end section, and the cutoff section of the fuse element portion are disposed in the internal chamber of the case, wherein the first securing portion has insulating properties, wherein the first securing portion contacts and presses against one surface of the fuse element portion, in order to bend the fuse element portion so that two cut ends of the cutoff section are pulled apart from each other, wherein the first end section is sandwiched between a ceiling surface of the internal chamber of the case and the first securing portion, and wherein the fuse element portion is held in the internal chamber of the case in a bent state such that, when the fuse element portion is cut, both cut ends of the cutoff section are pulled apart from each other.

2. The protective element according to claim 1, which, in order to bend the fuse element portion so that both cut ends of the cutoff section are pulled apart from each other, the protective element further comprises:
a second securing portion that contacts and presses against another surface of the fuse element portion, wherein the second end section is sandwiched between the case and the second securing portion.

3. The protective element according to claim 1, wherein the fuse element portion is held in the internal chamber of the case in a state that is bent into an S-shape.

4. The protective element according to claim 1, wherein the cutoff section is positioned in a central inflection section of the fuse element portion.

5. The protective element according to claim 1, wherein when an overcurrent flows, the fuse element portion is released from the bent state and is physically cut.

6. The protective element according to claim 1, wherein the cutoff section has a plurality of holes, and has a narrower width and/or a thinner thickness than the first end section and the second end section.

7. The protective element according to claim 1, wherein the cutoff section is held in a state sandwiched between claw-like portions provided on the first end section and the second end section.

8. The protective element according to claim 1, wherein the cutoff section is a laminated body comprising an inner layer composed of a low-melting point metal and an outer layer composed of a high-melting point metal.

9. The protective element according to claim 8, also having a heating element that heats the cutoff section.

10. The protective element according to claim 9, also having a third electrode portion, wherein a heat-generating body provided in the heating element has one end connected to the third electrode portion and the other end connected to at least one of the cutoff section, the first end section and the second end section.

11. The protective element according to claim 9, wherein when the heating element is heated, the low-melting point metal of the cutoff section melts and softens the cutoff section, the fuse element portion is released from the bent state, and the fuse element portion is physically cut.

12. The protective element according to claim 2, wherein the fuse element portion is held in the internal chamber of the case in a state that is bent into an S-shape.

13. The protective element according to claim 2, wherein the cutoff section is positioned in a central inflection section of the fuse element portion.

14. The protective element according to claim 2, wherein when an overcurrent flows, the fuse element portion is released from the bent state and is physically cut.

15. The protective element according to claim 2, wherein the cutoff section has a plurality of holes, and has a narrower width and/or a thinner thickness than the first end section and the second end section.

16. The protective element according to claim 2, wherein the cutoff section is held in a state sandwiched between claw-like portions provided on the first end section and the second end section.

17. The protective element according to claim 2, wherein the cutoff section is a laminated body comprising an inner layer composed of a low-melting point metal and an outer layer composed of a high-melting point metal.

18. The protective element according to claim 10, wherein when the heating element is heated, the low-melting point metal of the cutoff section melts and softens the cutoff section, the fuse element portion is released from the bent state, and the fuse element portion is physically cut.

* * * * *